(12) United States Patent
Takahiko

(10) Patent No.: US 6,971,653 B2
(45) Date of Patent: Dec. 6, 2005

(54) STEERING SKI FOR SNOW VEHICLE

(75) Inventor: Kubota Takahiko, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 54 days.

(21) Appl. No.: 10/366,287

(22) Filed: Feb. 13, 2003

(65) Prior Publication Data
US 2003/0151216 A1 Aug. 14, 2003

(30) Foreign Application Priority Data
Feb. 13, 2002 (JP) ............................ 2002-035508

(51) Int. Cl.[7] .............................................. B62B 13/00
(52) U.S. Cl. ...................................... 280/28; 180/182
(58) Field of Search ...................... 280/28, 609, 28.14; 180/182

(56) References Cited

U.S. PATENT DOCUMENTS 2,741,487 A * 4/1956 Carefoot ...................... 280/28
3,632,126 A * 1/1972 Shorrock ...................... 280/28
3,870,331 A * 3/1975 Cryderman .................. 280/28
2003/0189302 A1 * 10/2003 Makitalo ..................... 280/28

FOREIGN PATENT DOCUMENTS

| CA | 220836 | 7/1922 |
| CA | 232374 | 7/1923 |
| CA | 253557 | 9/1925 |
| CA | 517048 | 10/1955 |
| CA | 828641 | 12/1969 |
| CA | 897747 | 4/1972 |
| CA | 898310 | 4/1972 |
| CA | 955292 | 9/1974 |
| CA | 960729 | 1/1975 |

* cited by examiner

Primary Examiner—Bryan Fischmann
(74) Attorney, Agent, or Firm—Knobbe, Martens, Olson & Bear LLP

(57) ABSTRACT

A ski for a snow vehicle includes a ski body, a ski mounting bracket, and a keel. The ski body includes a generally horizontal surface that contacts the snow when the ski is in use. The ski mounting bracket is located on a top side of the ski body. The keel includes a forward portion and a rearward portion. The keel depends from and is adjustable with respect to the ski body.

44 Claims, 13 Drawing Sheets

STEERING SKI FOR SNOW VEHICLE

PRIORITY INFORMATION

This application is based on and claims priority to Japanese Patent Application No. 2002-035508, filed Feb. 13, 2002.

BACKGROUND OF THE INVENTION

1. Field of the Invention

The present invention generally relates to skis for snow vehicles. More particularly, the present invention relates to steering skis that provide improved handling for such vehicles.

2. Description of the Related Art

The use of snowmobiles and similar snow vehicles has increased in popularity in recent years. These vehicles are used for utilitarian purposes, for casual recreational purposes, and for sporting purposes. The vehicles typically are adapted to travel across snow and/or ice and usually include at least one forward facing ski along with a driven belt track or other propulsion mechanism, e.g., wheels. The forward-facing ski can be directed leftward or rightward by a steering handle to alter the direction of the snowmobile.

Typically, snowmobile steering skis are constructed having a plate-like ski body, which is formed integrally with a keel that protrudes from the bottom of the ski body toward the snow surface. This construction generally is superior to a completely flat ski. However, the desired construction of the ski body and the keel vary depending on the average snow conditions and/or the average load expected to be carried by the snowmobile.

While a snowmobile bearing steering skis produced as described above will perform reasonably well under average load and snow conditions, a specific snowmobile will seldom be operated in such conditions. For example, the load may be significantly smaller (e.g., a young adult) or larger (e.g., a heavy man pulling a large load) than the average expected load. Also, while certain snow conditions may he typical, a particular locality might receive vastly greater amounts of snowfall (e.g., an area subject to lake-effect snow) or may have little snow and a great deal of ice. Moreover, the snow conditions and load may vary to a great extent. As a result, a snowmobile with such skis will seldom perform as well as it could were the configuration of the skis better matched to the load and snow conditions.

SUMMARY OF THE INVENTION

A need therefore exists for an improved steering ski. The ski preferably improves handling in a wide variety operating conditions, e.g., snow and load-bearing conditions. More preferably, the ski provides a keel design that is adaptable to the prevailing operating conditions.

In one embodiment, the present invention comprises a ski for a snow vehicle. The ski has a ski body, a ski mounting bracket, and a keel. The ski body include, a generally horizontal surface that contacts the snow, when the ski is in use. The ski mounting bracket is located on a top side of the ski body. The keel includes a forward portion and a rearward portion. The keel depends from and is adjustable with respect to the ski body.

In another embodiment, the present invention comprises a ski for a snow vehicle. The ski is arranged along a central longitudinal plane. The ski has a ski body, a ski mounting bracket, and a keel. The ski body includes a generally horizontal surface that contacts the snow when the ski is in use. The ski mounting bracket is located on a top side of the ski body. The keel depends from the generally horizontal surface of the ski body to a keel base. A keel depth is defined between the generally horizontal surface and the keel base. A keel width is defined between a first outermost lateral edge of the keel on one side of the central longitudinal plane and a second outermost lateral edge of the keel on the other side of the central longitudinal plane. The ski also has a keel adjustment mechanism that adjusts an aspect of the keel.

In another embodiment, the present invention comprises a ski for a snow vehicle. The ski includes a ski body, a ski mounting bracket, a keel, and means for adjusting the keel. The ski body includes a generally horizontal surface that contacts the snow when the ski is in use. The ski mounting bracket is located on at op side of the ski body. The keel depends from the generally horizontal surface of the ski body to a keel base. The keel includes a forward portion and a rearward portion.

BRIEF DESCRIPTION OF THE DRAWINGS

The above and other features, aspects and advantages of the present invention will now be described with reference to drawings that show a presently preferred arrangement that is intended to illustrate and not to limit the present invention and in which drawings.

DETAILED DESCRIPTION OF THE PREFERRED EMBODIMENT

Figure 1:
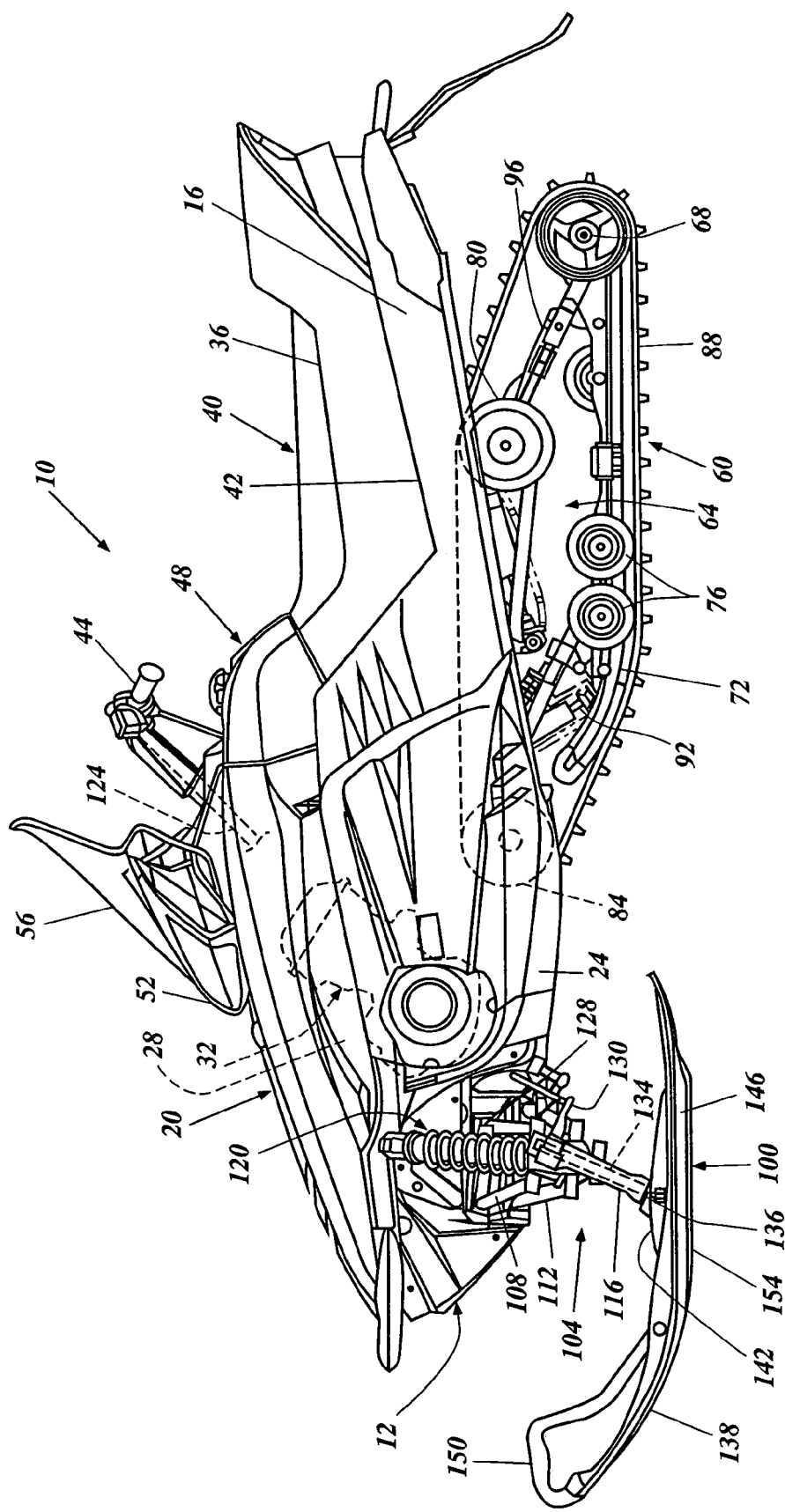
FIG. 1 is a side elevation view of a snowmobile that has a pair of steering skis configured in accordance with certain features, aspects, and advantages of the present invention.
Figure 2:
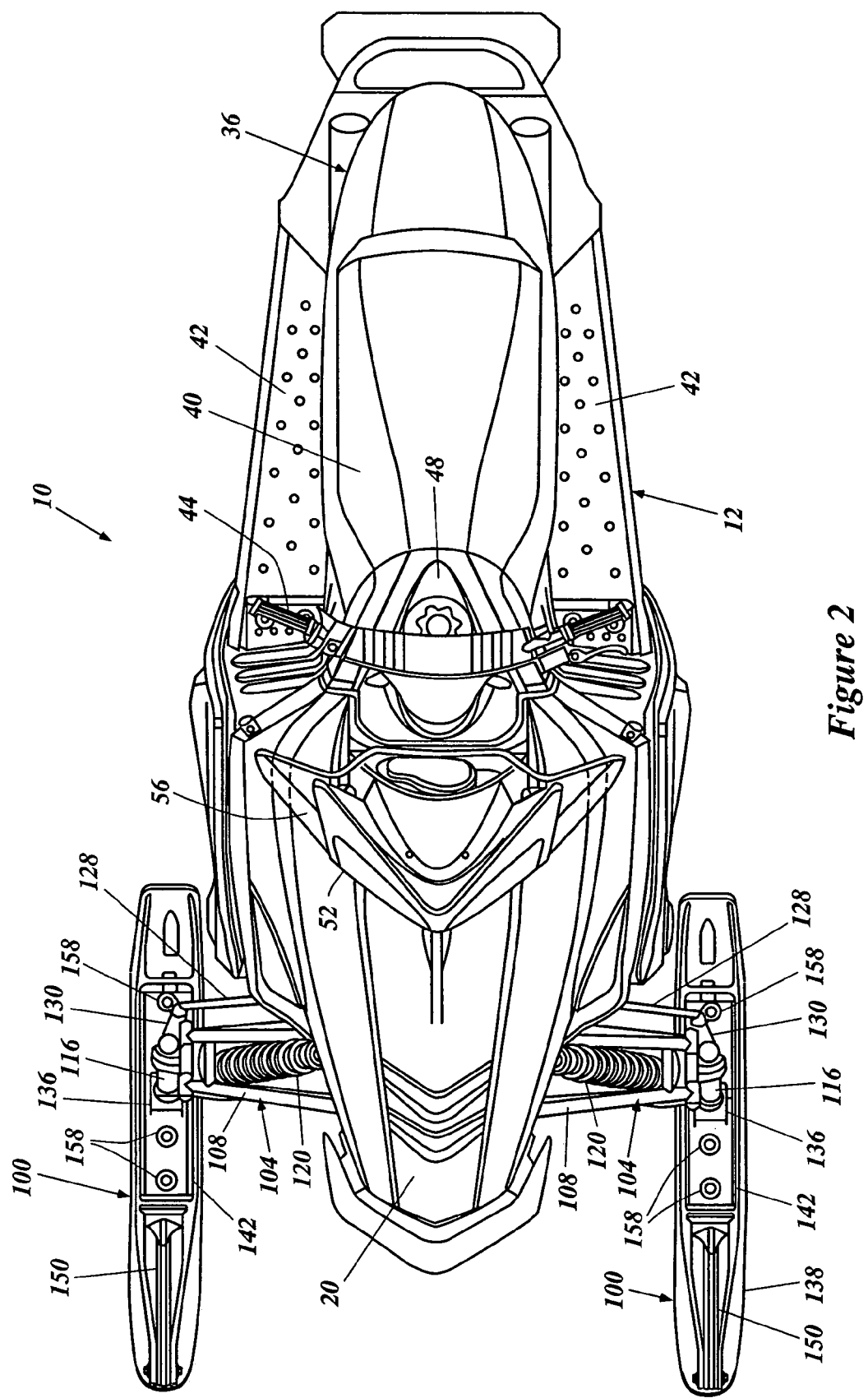
FIG. 2 is a top plan view of the snowmobile of FIG. 1.
Figure 3:
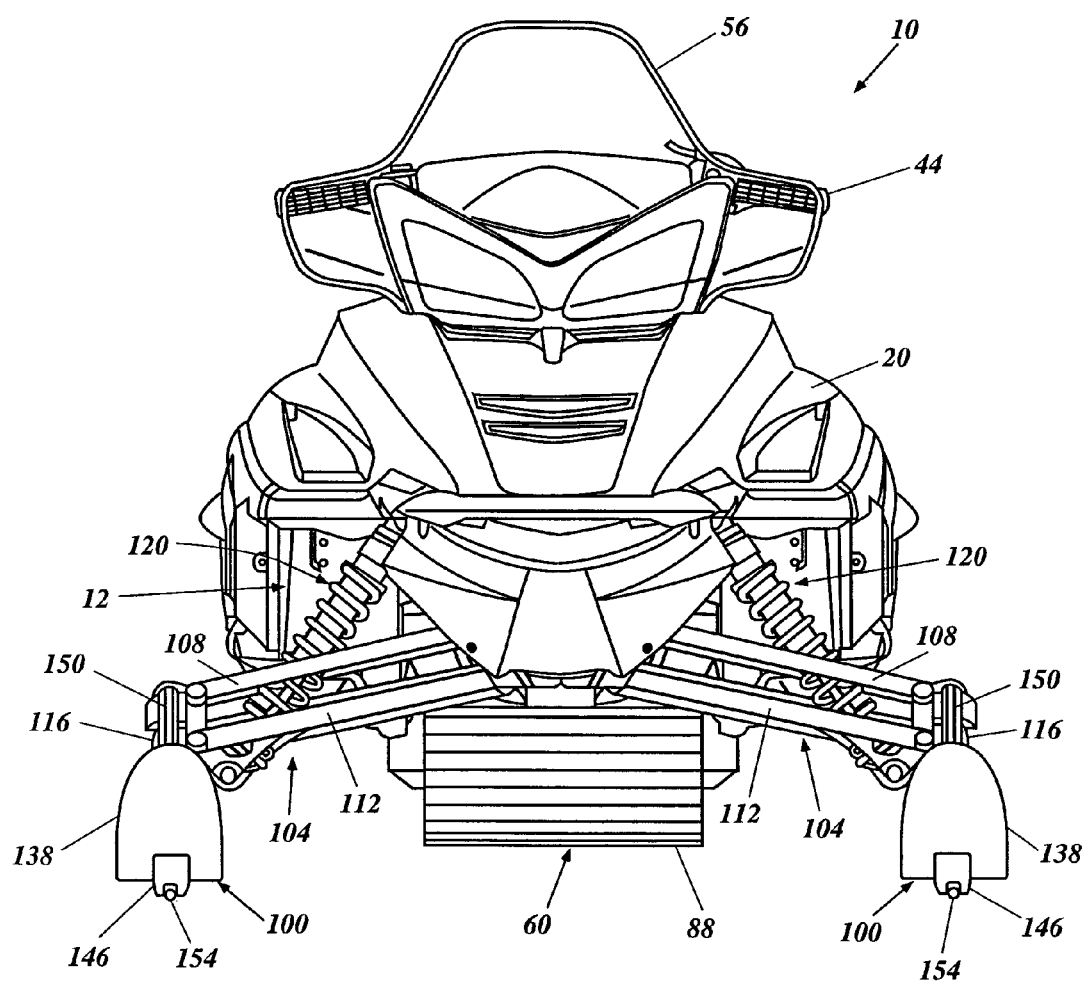
FIG. 3 is a front view of the snowmobile of FIG. 1.
Figure 4:
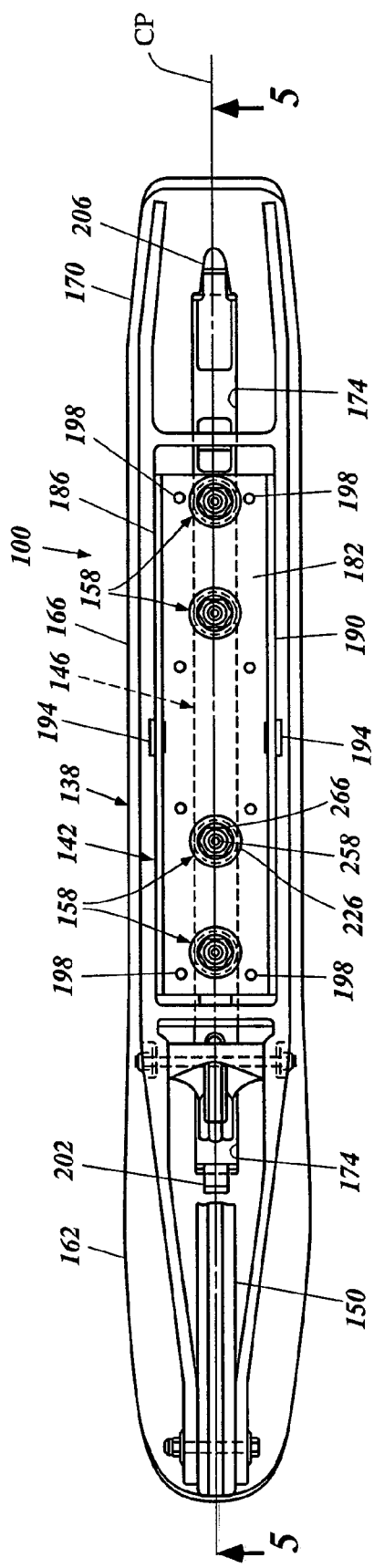
FIG. 4 is a top plan view of one embodiment of a steering ski.

With reference initially to FIG. 1, a snowmobile having a pair of steering skis constructed in accordance with an embodiment of the present invention is identified generally by the reference numeral 10. While described in the context of a snowmobile, it should be readily appreciated that the present invention also can be used in a variety of other applications, such as all terrain vehicles having at least one ski, for instance. The snowmobile 10 includes a body assembly 12 made up of a number of part, which may be formed from suitable materials. The illustrated body assembly 12 includes a frame 16, an upper engine shroud 20, and a lower tray 24. The upper engine shroud 20 and the lower tray 24 are connected to the frame 16. Together the upper engine shroud 20 and the lower tray 24 define an engine compartment 28 that preferably houses an internal combustion engine 32 for powering the snowmobile 10.

The illustrated body assembly 12 further includes a rear portion 36 that accommodates a scat 40, which is adapted to seat one or more riders in a straddle fashion. A footrest 42 is provided on either side of the seat 40. A handlebar assembly 44 is positioned in front of the seat 40 for operation by the rider. As discussed in more detail below, the handlebar assembly 44 can be manipulated by the rider to direct the snowmobile 10. A fuel tank 48 is positioned generally between the handlebar assembly 44 and the scat 40.

The illustrated upper engine shroud 20 includes a raised portion 52 located in front of the handlebar assembly 44. The raised portion 52 carries a windshield 56, which generally shields the rider operating the snowmobile 10 from wind, snow, branches and other objects.

A carriage assembly 60 is supported at the rear portion 36 of the body 12 below the seat 40 by a rear suspension system 64. The carriage assembly 60 includes a rear pulley 68, a pair of guide rails 72 that carry a plurality of lower idler rollers 76, and an upper idler roller 80. The rear pulley 68 is coupled with the guide rails 72. A font pulley 84 is coupled with the engine 28 and transmits the rotational energy of the engine 28 to certain components of the carriage assembly 60 to provide motive force for the snowmobile 10, as discussed below.

The guide rails 72 and idler rollers 76, 80, along with the pulleys 68 and 84, form a path around which a drive track 88 is trained. The drive track 88 is driven by an output shaft (not shown) of the engine 28 through a suitable variable belt-type transmission (not shown), as is well known in the art. The variable belt-type transmission is coupled with and drives the front pulley 84. The drive track 88 is suspended relative to the body 12 by a front suspension system, indicated generally by the reference number 92, and a rear suspension system, indicated generally by the reference numeral 96. The front and rear suspension systems 92, 96 are connected to the guide rails 72, which hack up tile drive track 88, as discussed above.

A pair of front skis 100, having a construction described below, are supported in a manner also to be described at a forward portion of the body 12. In particular, each of the front skis 100 is supported at a forward portion of the body through a suspension mechanism 104 that includes an upper A-arm 108, a lower A-arm 112, a strut 116, and a shock absorber 120. The outer end of each of the A-arms 108, 112 is connected to tire strut 116 and the inner end of each of the A-arms 108, 112 is connected to the body 12. Each of the struts 116 is connected to the corresponding ski 100 and coveys steering movement of the handlebar assembly 44 to the corresponding ski 100 in a manner described below. Each of the shock absorbers 120 is mounted between the strut 116 and the body 12. Thus, the left and right steering skis 100 are each suspended independently.

A steering system is also provided whereby a rider can direct the skis 100 by manipulating the handlebar assembly 44. The steering system includes a primary steering shaft 124 that is coupled with the steering handle 44, an L-shaped link arm (not shown), left and right tie rods 128, left and right steering arms 130, and left and right secondary steering shafts 134. A first end of the L-shaped link arm is coupled with the lower end of the primary steering shaft 124 in any suitable manner. Another end of the L-shaped link arm is coupled with an inner end of each of the tie rods 128. An outer end of each of the tie rods 128 is connected to the corresponding steering arm 130. Each of the steering arms 130 is also connected to the corresponding secondary steering shaft 134. Preferably a steering ski support shaft 136 is provided whereby each of the secondary steering shafts 134 is coupled with the corresponding ski 100 in a mariner discussed More fully below.

In one embodiment, the ski 100 includes a ski body 138, a ski mounting bracket 142, and a keel 146. A handle 150 preferably is provided at a forward portion of the ski body 138. When provided, the handle 150 enables the rider to change of the direction of the ski 100 from the front of the snowmobile 10 without manipulating the handlebar assembly 44. In the illustrated embodiment, the ski mounting bracket 142 is located on the top side of the ski body 138, i.e., the side that does not contact the snow directly, and is coupled with the ski body 138 in a manner described below. The keel 146 protrudes from the ski body 138 to a keel base 152, which extends into the snow when the ski 100 is assembled and is mounted to the snowmobile 10. A wear bar 154 is coupled with a lower surface of the keel 146 proximate the keel base 152 in a manner described below. The wear bar 154 preferably comprises iron, steel, carbide, or some other long-wearing material to extend the life of the keel 146 and the ski 100.

Figure 13:
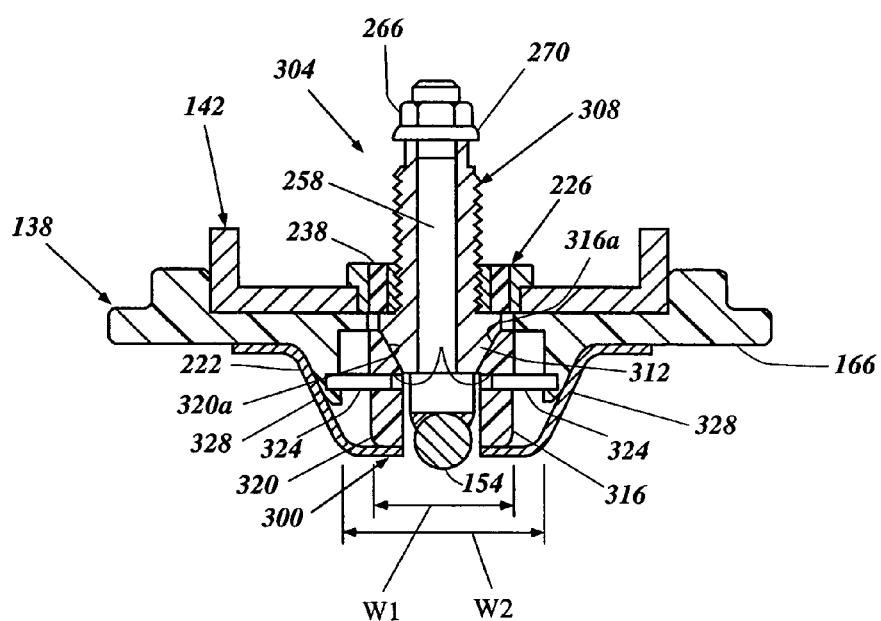
FIG. 13 is a cross-section view of another embodiment of a keel adjustment mechanism for a steering ski.

The keel 146 advantageously is adjustably coupled to the ski body 138 by at least one keel adjustment mechanism that can be manipulated try change at least one aspect of the keel 146. As shown in FIGS. 4–12, one embodiment of the ski 100 provides a plurality of keel adjustment mechanisms 158 that call be manipulated to fix the keel 146 in a selected position or a selected orientation with respect to the rest of the ski 100. In the embodiment of FIGS. 4–12, each of the skis 100 preferably is provided with four keel adjustment mechanisms 158. In one embodiment, two keel adjustment mechanisms 158 are provided forward of the location where the ski 100 is coupled to the strut 116 and two keel adjustment mechanisms 158 are provided rearward of the location where the ski 100 is coupled to the strut 116. In one embodiment, the keel adjustment mechanisms 158 move at least a portion of the keel 148 upward and downward with respect to the ski body 138. As is discussed in more detail below, two aspects of the keel 146 that the keel adjustment mechanisms 158 can adjust are the keel depth and the angle of the keel 146. The angle of the keel 146 can be defined with respect to the plane of the ground or with respect to a generally planar central portion of the ski body 138, referred to herein as the snow contacting portion. As used herein, "keel depth" refers to the distance from the keel base 152 to the snow contacting portion. Other keel adjustment mechanisms can also he provided that adjust other aspects of the keel 146. For example, as shown in FIG. 13, a keel can be provided wherein the width of the keel can be adjusted by a keel adjustment mechanism. In addition, a keel adjustment mechanism can be provided that adjusts the lateral position of the keel 146 on the ski 100.

FIGS. 4–7 illustrate further details of the construction of the skis 100. The ski body 138 includes an upturned leading portion 162, a snow contacting portion 166, and a rear portion 170. The snow contacting portion 166 preferably includes a generally horizontal surface that extends outwardly from a central longitudinal plane CP of the ski 100. The upturned leading portion 162 advantageously is formed such that it curves upwardly with respect to the generally horizontal surface of the snow contacting portion 166. The rear portion 170 preferably also is curved upwardly with respect to the generally horizontal surface of the snow contacting portion 166. In one embodiment, the rear portion 170 curves upwardly to a lesser extent than does the upturned leading portion 162. The ski body 138 also includes, a keel mounting slot 174 and a keel guide 178. In one embodiment the keel guide 178 is a downwardly projecting structure, e.g., a flange, located on either side of the keel mounting slot 174 (see FIGS. 7 and 10). In one embodiment, the keel 146 can he adjusted within the keel mounting slot 174 along the keel guide 178.

Figure 7:
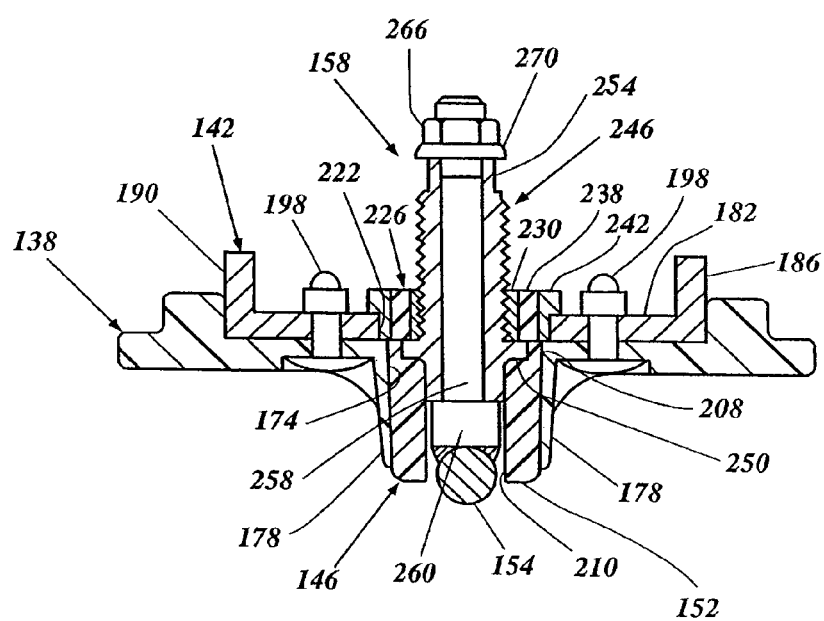
FIG. 7 is a cross-section view of the keel adjustment mechanism of FIG. 6 taken along the section plane indicated by line 7—7 in FIG. 6.

The ski mounting bracket 142 includes a bracket body 182, a right-side wall 186, and a left-side wall 190. The right- and left-side walls 186, 190 preferably are longitudinally extending ridges on the lateral sides of the bracket body 182. Thus, the bracket body 182, the right side-wall 186, and the left side-wall 190 form a channel that faces upwardly when the ski mounting bracket 142 is fixed to the ski body 138. In one embodiment, the right- and left-side walls 186, 190 each have increasing height with respect to the bracket body 182 toward their respective longitudinal mid-sections. Each of the right- and left-side walls 186, 190 is provided with a boss 194 that is configured to couple with and support the steering ski support shaft 136. The ski mounting bracket 142 preferably is coupled with the ski body 138 by a plurality of rivets 198. As illustrated in FIG. 7, the rivets 198 preferably extend through the bracket body 182. Any suitable fastener could be used to interconnect the bracket body 182 and the ski body 138.

The keel 146 preferably comprises an elongate body that extends between a forward portion 202 and a rearward portion 206. The keel 146 preferably also includes a plurality of horses 208 that are spaced along the keel 146 between the forward portion 202 and the rearward portion 206. The bosses 208 are adapted to abut against the bottom of the bracket body 182 of the ski mounting bracket 142 when the ski 100 is fully assembled. The bosses 208 preferably are provided within and supported by the keel guide 178 for up and down adjustment therein (i.e., vertical adjustment). In the illustrated arrangement, each of the bosses 208 has a shoulder 209 that engages a portion of the keel adjustment mechanism 158, as discussed below. In one embodiment, the keel 146 includes four bosses 208, with two bosses 208 provided forward of the location where the ski 100 is coupled to the strut 116 and two bosses 208 provided rearward of the location where the ski 100 is coupled to the strut 116.

The keel 146 extends along a substantial portion of the length of the snow, contacting portion 166 when the keel 146 is coupled with the ski body 138. A recess 210 that extends longitudinally preferably is formed in the keel base 152. The wear bar 154 is at feast partially received in the recess 210. In some arrangements, a cleat 214 is positioned along the length of the wear bar, e.g., near the center longitudinally of the wear bar 154. The cleat 214 is a carbide tip in one embodiment that reduces sideslip when the snowmobile 10 is operated oil ice or the like.

As described above, the keel mounting slot 174 is formed large enough to receive at least a portion of the keel 146 in a manner that permits the keel 146 to move up and down with respect to the ski body 138. In one embodiment, the forward and rearward portions 202, 206 of the keel 146 engage with upper surfaces of the front and rear edges of the keel mounting slot 174 of the ski body 138. In one embodiment, the forward portion 202 of the keel 146 extends over and forward of the forward end of the keel mounting slot 174 and the rear end 206 of the keel 146 extends over and behind the rear end of the keel mounting slot 174.

The bracket body 182 of the ski mounting bracket 142 preferably includes circular through-holes 222 that are positioned so as to be aligned with the bosses 208 when the ski 100 is fully assembled. In some arrangements, a bushing 226 is positioned in the support hole 222. The bushing 226 preferably includes an inner cylinder 230 that has female threads formed therein. An elastic member 238, which preferably acts as a damper, is disposed around the inner cylinder 230. Thus, the elastic member 238 advantageously reduce vibrations and shocks from the snow surface from being transmitter to a rider during operation of the snowmobile 10. In known skis, jolts from the track to the ski are transmitted directly to the rider, which hastens rider fatigue. Thus, the elastic member 238 proximate the keel adjustment mechanism 158 makes riding more comfortable over long distances. An outer cylinder 242 is bonded to the elastic member 238. The outer cylinder 242 preferably is press-fit into the support holes 222. In one embodiment, the outer cylinder 242 is provided with a shoulder that rests on an upper surface of the bracket body 182.

In one embodiment, the keel adjustment mechanism 158 includes an adjustment screw 246 that has male threads formed on an outer surface thereof that are configured to engage the female threads formed in the inner cylinder 230. The adjustment screw 246 also has an annular projection 250 located at the lower end thereof and a tool coupling site 254. The annular projection 250 abuts against the shoulder 209, which, as discussed above, is formed in the inside wall of the boss 208. In one arrangement, the tool coupling site 254 is formed of two relatively flat surfaces on opposing sides of the upper end of the outside circumferential portion of the adjustment screw 246. Rotation of the adjustment screw 246, e.g., by rotation of a wrench or other adjustment tool that engages the tool coupling site 254, causes the adjustment screw, 246 to be advanced or retracted. If the adjustment screw 246 is advanced, the annular projection 250 acts upon the shoulder 209 and causes the shoulder 209 and the boss 208 to be moved away from the ski body 138 and the ski mounting bracket 142. This in turn causes the keel 146 proximate the adjustment screw 246 that is being advanced to be moved away form the ski body 138 and the ski mounting bracket 142. If, on the other hand, a wrench engages the tool coupling site 254 and causes the adjustment screw 246 to he retracted, the wear bar 154 and the keel 146 will he drawn toward the ski 138 and the ski mounting bracket 142.

Preferably the wear bar 154 is coupled with the adjustment screw 246. In one arrangement, a bolt 258 extends longitudinally through the adjustment screw 246. The bolt 258 has a lower end 260 that is coupled with the wear bar 154 by any suitable process, e.g., by welding. The lower end of the bolt 258 also preferably abuts a lower surface of the adjustment screw 246. In one arrangement, the lower end of the bolt 258 comprises a shoulder 262 that faces upwardly and that abuts the bottom of the adjustment screw 246. The upper end of the bolt 258 protrudes from the upper end of the adjustment screw 246. Preferably a out 266 is threaded onto the bolt 258 with a washer 270 positioned between the nut 266 and the adjustment screw 246 proximate the tool coupling, site 254. This arrangement reduces the likelihood of inadvertent rotation of the adjustment screw 246 after an adjustment is made, in addition to interconnecting the wear bar 154 and the ski body 138. Loosening the nut 266 allows rotation of the adjustment screw 246. Other arrangements known in the art can be used to reduce the likelihood of inadvertently rotation of the adjustment screw 246 after an adjustment has been made.

Referring now to FIGS. 7–10, the operation of the keel adjustment mechanisms 158 will now be discussed in greater detail. To adjust the position of the keel 146 with respect to the ski body 138, one or more of the nuts 266 are loosened and file corresponding adjustment screw(s) 246 are advanced in or out by a tool. This allows the keel 146 and the wear bar 154 to be advanced and/or retracted. In one application, all of the adjustment screws 246 can he advanced by a same amount to a maximum keel depth, corresponding to the position A. In another application, all of the adjustment screws 246 can be retracted by a same amount to a minimum keel depth corresponding to the position B. Thus, the keel adjustment mechanisms 158 can be adjusted to provide a desired keel depth in response to one or more operating conditions, such as the snow quality or the number of crew members. The keel adjustment mechanisms 158 also advantageously provide for adjustment to suit a rider's preference. After the desired keel depth is achieved, the nuts 266 are tightened to lock the adjustment screws 246.

The keel adjustment mechanisms 158 advantageously also enable simple replacement of the wear bar 154 of the keel 146. To replace either or both of these components, the nuts 266 and the washers 270 are removed from the adjustment screws 246. The wear bar 154, or the wear bar 154 and the keel 146, together with the bolts 258, can then be withdrawn from the bottom of the ski 100. Thus, the keel 146, the wear bar 154, and the bolts 258 are removed from the ski body 138. This procedure is simple to perform and reduces the cost of owning the snowmobile 10 because replacing the keel 146 and/or the wear bar 154 is much less expensive than replacing an entire ski.

The keel adjustment mechanisms 158 can also be manipulated so that the protrusion of the keel 146 is not uniform from the front of the keel 146 to the back of the keel 146. In one application, the keel adjustment mechanisms 158 that are forward of the location where the ski 100 is coupled to the strut 116 are advanced and/or the keel adjustment mechanisms 158 that are rearward of the location where the ski 100 is coupled to the strut 116 are retracted so that the protrusion of the keel 146 increases from the rear to the front. See FIG. 11. In another application, the keel adjustment mechanisms 158 that are forward of the location where the ski 100 is coupled to the strut 116 are retracted and/or the keel adjustment mechanisms 158 that are rearward of the location where the ski 100 is coupled to the strut 116 are advanced so that the protrusion of the keel 146 increases from the rear to the front. See FIG. 12.

Figure 5:
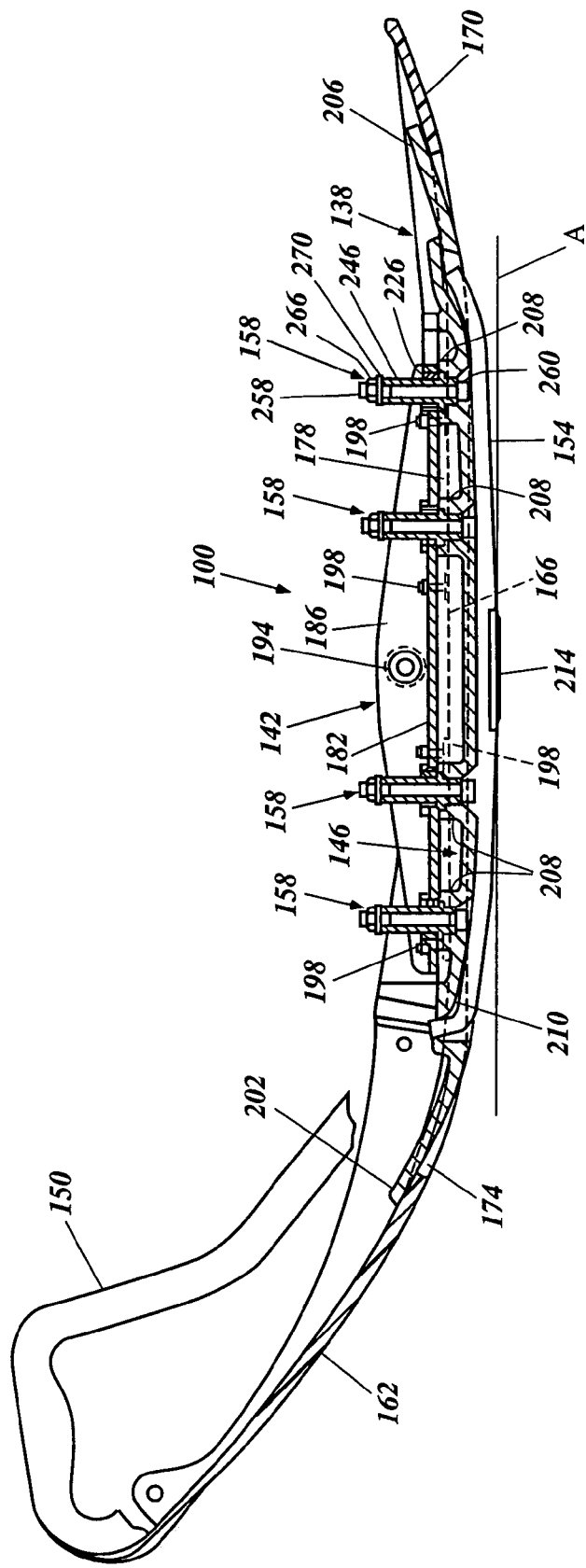
FIG. 5 is a cross-section view of the steering ski of FIG. 4 taken along the sectional plane indicated by the line 5—5 in FIG. 4.
Figure 6:
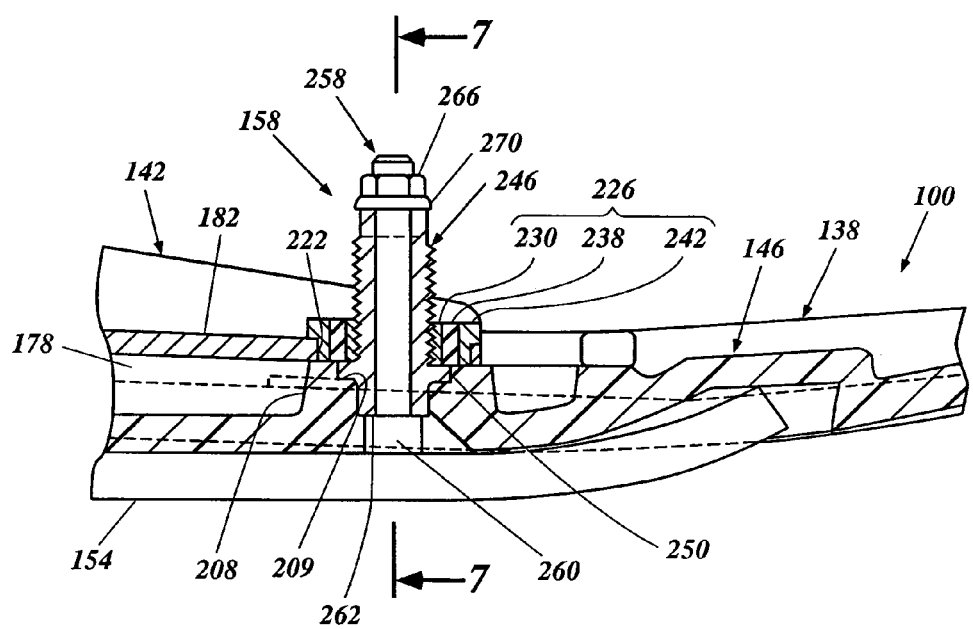
FIG. 6 is an enlarged detail view of a portion of FIG. 5 illustrating one embodiment of a keel adjustment mechanism.

The above applications can be selected in response to the operating conditions, as discussed above. For example, if two crew members are long-range riding on hard snow, the ski 100 can be adjusted so that the keel depth is minimized, as illustrated in FIG. 5. This generally decreases the load on the handlebar assembly 44 and enhances stability of the snowmobile 10. Such decrease in the handlebar load is desirable because when two crew members are provided, the load oil the ski increases, and the corresponding load on the handlebar assembly 44 also increases. In long-range riding, the driver grasps the handlebar assembly 44 for a long time. Therefore, it is advantageous to reduce the tendency of the ski to bite into the snow, i.e., the ski action, as much as possible to reduce the amount of steering force needed to operate the handlebar assembly 44, and thus to lengthen the riding time before the rider becomes fatigued.

Figure 8:
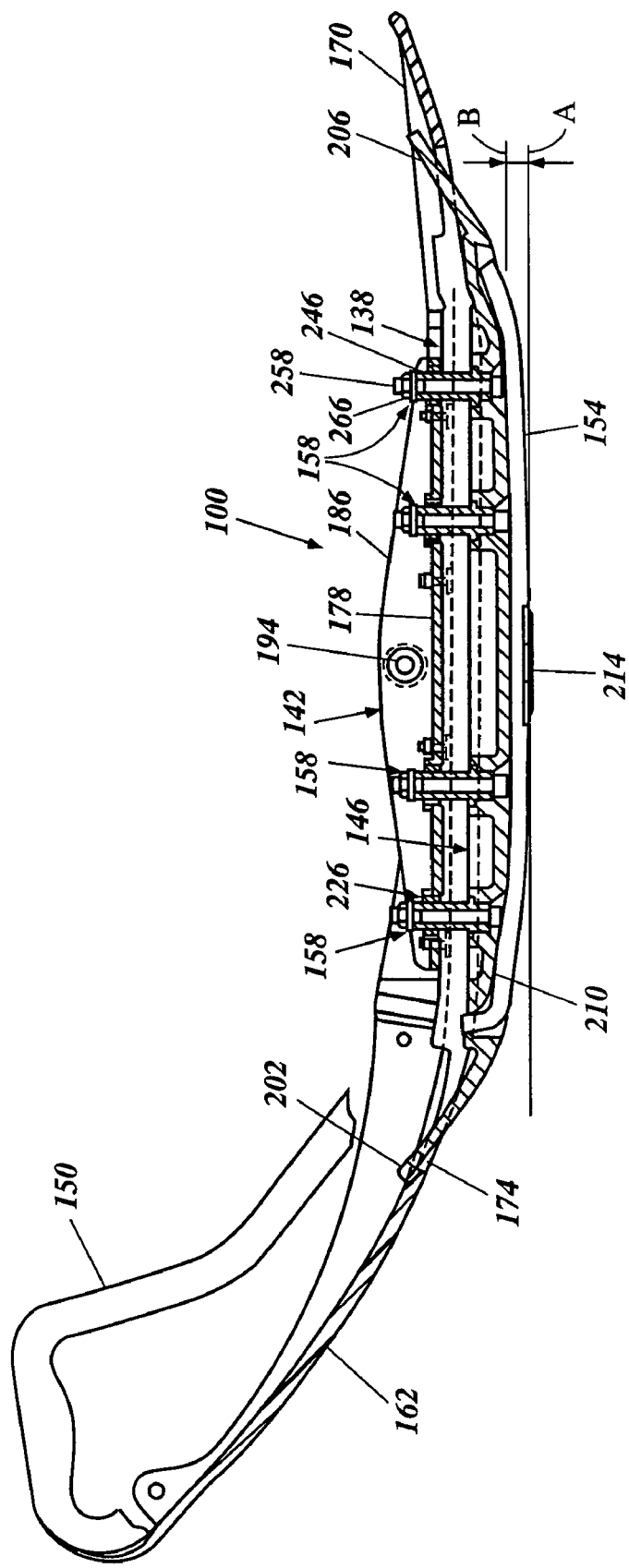
FIG. 8 is cross-section view similar to the cross section view of FIG. 5 showing a first pair of adjustment positions provided by the keel adjustment mechanism of FIGS. 6 and 7.
Figure 9:
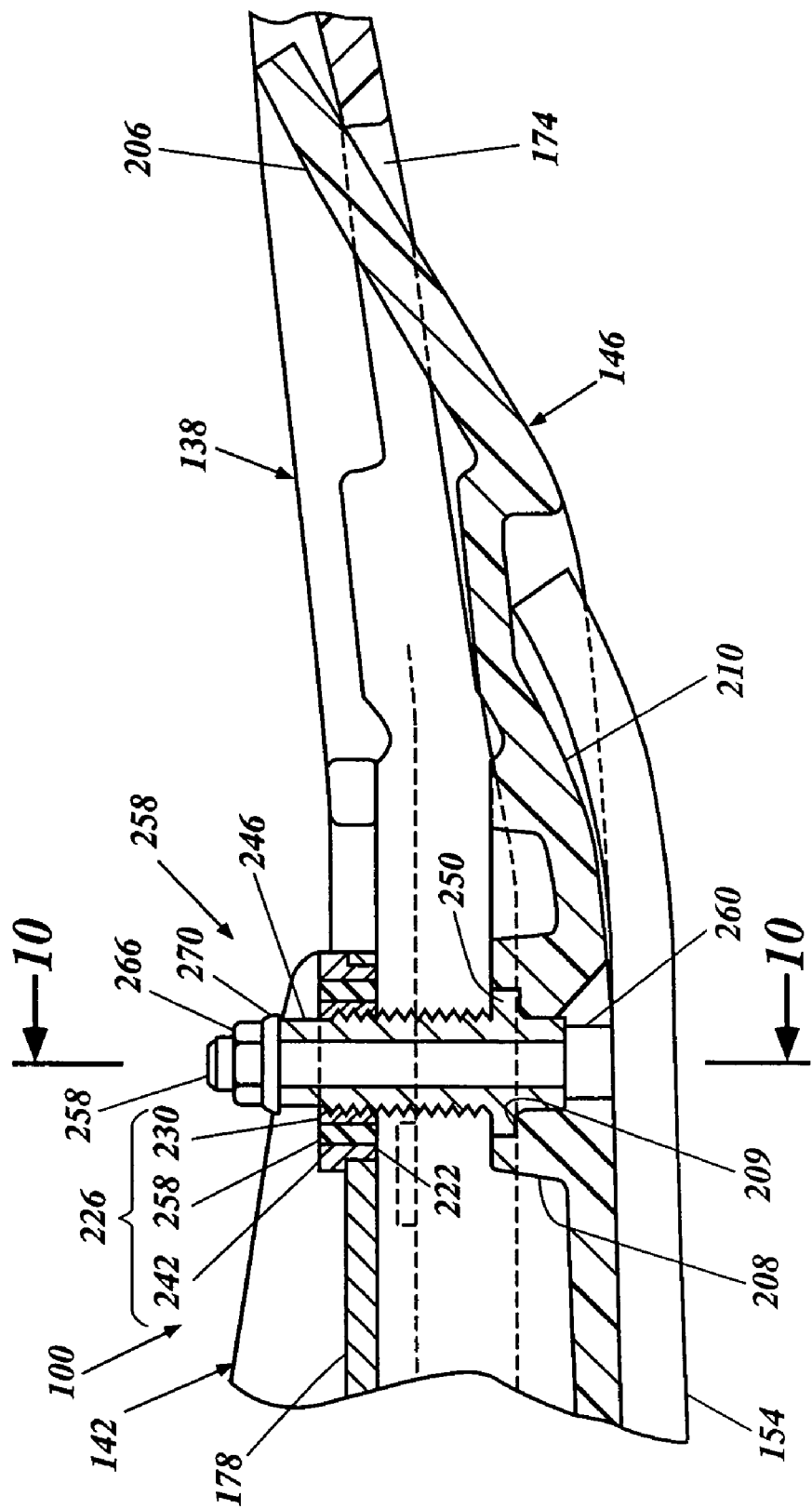
FIG. 9 is an enlarged detail view of a portion of FIG. 8 showing in greater detail the two adjustment positions shown in FIG. 8.
Figure 10:
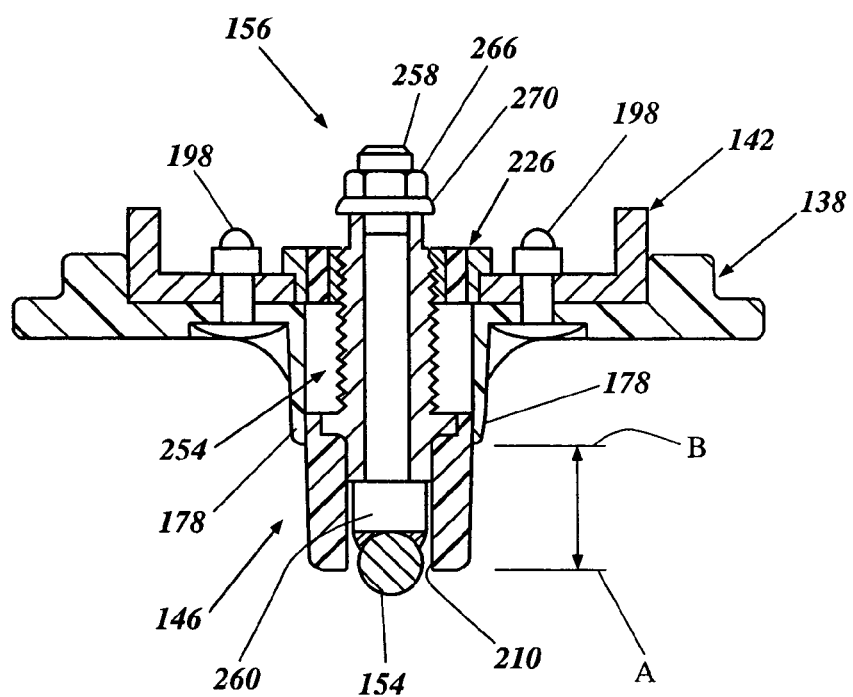
FIG. 10 is a cross-section view of the keel depth adjustment mechanism of FIG. 9 taken along the section plane indicated by the line 10—10 in FIG. 9.

On the other hand, in the case of fresh, powdery snow, deep snow, or aggressive riding, the ski 100 can be adjusted so that the keel depth is maximized, as illustrated in FIG. 8. Increasing keel depth generally increases ski action, i.e., the amount of steering force transmitted by the ski to the snow beneath the ski. Improved ski action enhances the responsiveness of the snowmobile 10 to movement of the handlebar assembly 44, e.g., the handling of the snowmobile 10. In addition, greater keel depth provides more nimble handling without Corresponding loss of speed during a race or the like.

Figure 11:
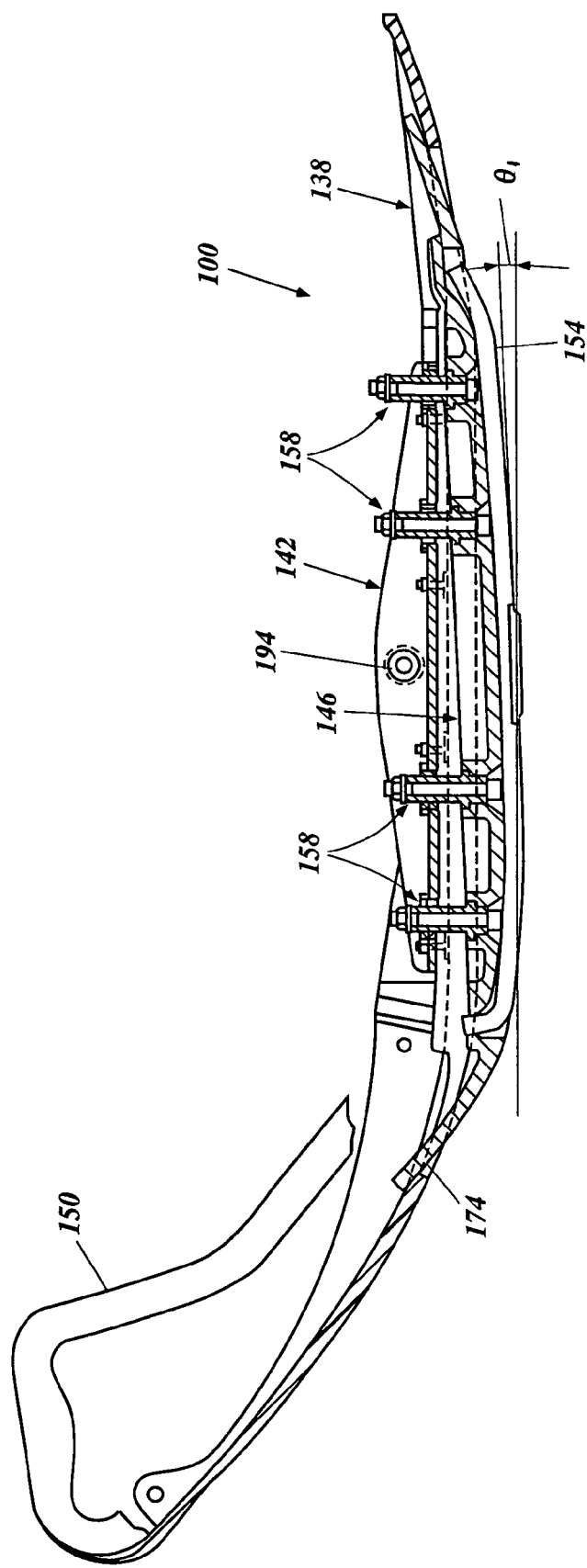
FIG. 11 is a cross-section view similar to the cross section view of FIG. 8 showing a second pair of adjustment positions provided by the keel adjustment mechanism of FIG. 6.
Figure 12:
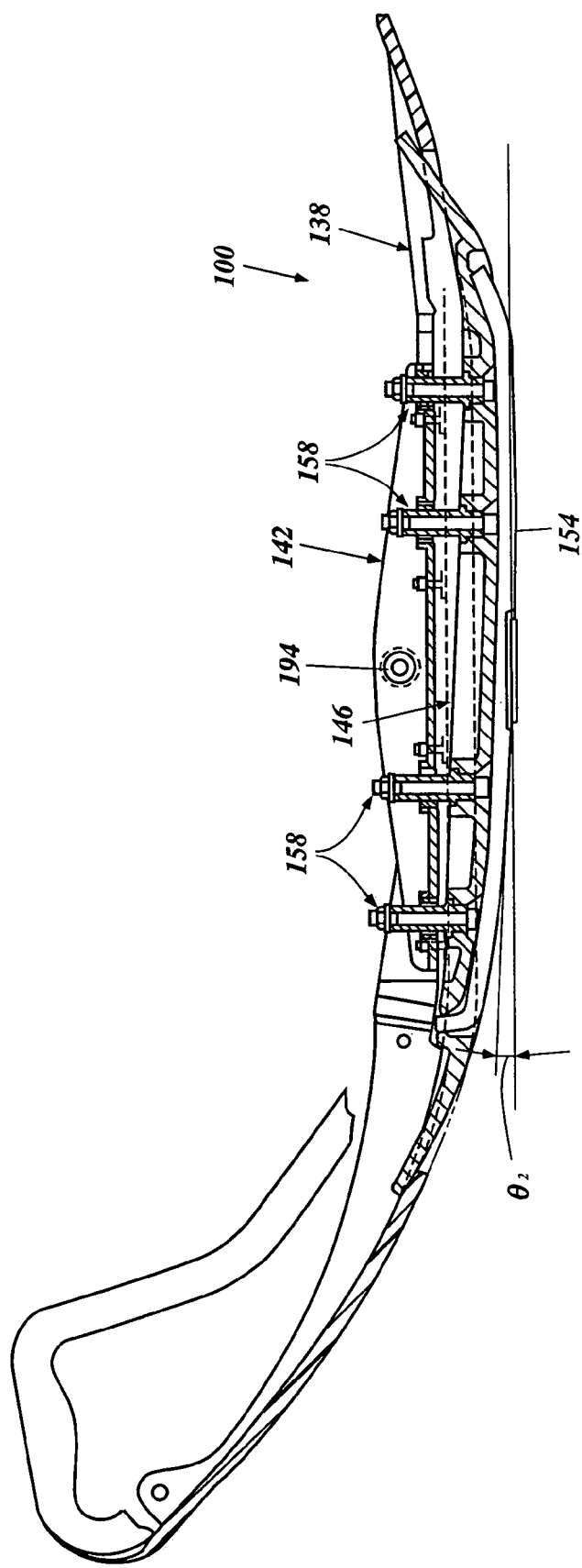
FIG. 12 is a cross-section view similar to the cross section view of FIG. 8 showing a third pair of adjustment positions provided by the keel adjustment mechanism of FIG. 6.

Furthermore, if well-defined ruts have been formed in the track where the snowmobile travels, darting may occur. Darting is the tendency of the snowmobile to follow in a well-defined track left by other snowmobiles rather than respond to the steering input of the rider. In such conditions, the forward portion of the keel 146 can be adjusted to the maximum keel depth position A and the rearward portion of the keel 146 can be adjusted to minimum keel depth position B. This will cause the keel 146 to form an angle $\theta_1$ with respect to the snow contacting portion 166 of the ski body 138. This application is illustrated in FIG. 11. By raising the front portion of the ski 100 to a higher position, the ski 100 is more able to escape from previously-defined ruts in the snow, which makes travel more stable.

Furthermore, straight-ahead travel can be made more stable if forward portion of the keel 146 is adjusted to minimum keel depth position B and the rearward portion of the keel 146 can be adjusted to maximum keel depth position A. This will cause the keel 146 to form an angle $\theta_2$ with respect to the snow contacting portion 166 of the ski body 138. See FIG. 12. This arrangement improves stability during high speed operation of the snowmobile 10.

Thus, desired ski characteristics can be obtained by selected a desired the keel depth of the keel or a desired angle of the keel. Such characteristics can be selected in response to operating conditions such as the quality of the snow, the number of crew members, etc., to provide better handling, more stable running, and reduced steering load on the handlebar assembly 44.

Although the foregoing embodiments illustrate the wear bar 154 and the keel 146 being advanced and retracted together, in some applications it may be desirable to adjust the amount of protrusion of either the keel 146 or the wear bar 154 separately. For example, if protrusion of only the wear bar 154 is changed, action of the ski edges can be increased during running on ice or a hard snow surface.

In another embodiment, the keel 146 and the ski body 138 are integrally made. In this embodiment, elastic deformation of the keel and/or the ski provide for adjustment of the keel 146 in response to the operating conditions.

FIG. 13 illustrates another embodiment that is similar to that illustrated in FIG. 7, except as set forth below. The embodiment of FIG. 13 includes a keel 300 and a plurality of keel lateral dimension adjustment mechanisms 304 that can adjust a transverse dimension of the keel 300, e.g., the width of the keel 300. The keel lateral dimension adjustment mechanism 304 are disposed on the snow contacting portion 166 of the ski body 138. Each keel lateral dimension adjustment mechanists 304 comprises an adjustment screw 308, a tapered section 312, a left-side keel portion 316, and a right side keel portion 320. The left and right keel sections 316, 320 extend longitudinally and are displaceable, e.g., by being elastically deformable, or otherwise movable laterally. The adjustment screw 308 is threaded through the bushing 226. A bolt 258 is inserted through the adjustment screw 308 to selectively secure it in place as discussed above in connection with the adjustment screw 246. The tapered section 312 is formed at the bottom of the adjustment screw 308 and preferably is trapezoidal in cross section.

The left and right keel sections 316, 320 are supported on the ski body 138 such that the lateral dimension of the keel 300 can be expanded or contracted. In one embodiment, a pin 324 is fixed to each of the keel sections 316, 320. The pins 324 are also coupled with the keel guide 178. A flexible cover 328 is provided over the ski 100 to reduce the likelihood of ingress of snow into the keel guide 178. The cover 328 may be formed integral with the ski body 138.

The left and right keel sections 316, 320 are formed with tapered surfaces 316a, 320a that are configured and located to abut the tapered section 312. As the adjustment screw 308 is advanced and retracted, the lateral dimension defined by the left and right keel sections 316, 320, between a minimum width W1 and a maximum width W2.

In this embodiment, keel lateral dimension adjustment mechanism 304 are provided fix adjusting the lateral dimension defined by the left and right keel sections 316, 320. Adjustment of the lateral dimension declined by the left and right keel sections 316, 321 are between the minimum width W1 and the maximum width W2 in response to changes in the operating conditions, e.g., snow quality, alters the surface pressure to the snow surface. Thus, the controllability and running stability of the snowmobile 10 can be enhanced. For example, if the lateral keel dimension is set to the maximum width W2, surface pressure to the snow, surface is decreased. This causes operating load of the handlebar assembly 44 to be reduced, and handling to be improved. If the lateral keel dimension is set to the minimum width, W12, surface pressure to the snow surface is increased. Increased surface pressure increases stability of the snowmobile 10.

Moreover, as discussed above, the keel lateral dimension adjustment mechanism 304 preferably are disposed forward of and rearward of the location where the ski 100 is coupled to the strut 116. As discussed above, the keel 300 can he adjusted independently, so that the lateral keel dimension can be adjusted separately from the front of the ski to the rear of the ski, and the detailed setting of the surface pressure to the snow surface can he provided.

Although the foregoing embodiments illustrate adjustment of the keel depth (in connection with the keel 146) and of the lateral dimension of the keel (in connection with the keel 300), another embodiment provides a plurality of keel lateral position adjustment mechanisms. Thus, the distance between the keel on the left-side ski and the keel oil the right-side ski can be adjusted. As discussed above, a plurality of mechanisms can he provided along the keel to adjust the lateral position of the keel. Thus the distance between the left and right-side keels can he varied from the front of the keels to the rear of the keels. Thus, the lateral position of the keel can he adjusted in a variety of ways based oil the operating conditions.

In another embodiment, a combination of keel adjustment mechanisms is provided. For example, in one embodiment, the first keel adjustment mechanism provides for adjustment of the keel depth, a second keel adjustment mechanism provides adjustment of the lateral dimension of the keel, and a third keel adjustment mechanism provides adjustment of the lateral keel position. As discussed above, a plurality of each of these mechanisms can be provided so that each adjustment can be varied along the length of the keel.

Although the present invention has been described in teens of certain preferred embodiments, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. A ski for a snow vehicle, comprising:
a ski body comprising a generally horizontal surface that contacts the snow when the ski is in use;
an opening being formed in the ski body;
a ski mounting bracket located on a top side of the ski body;
a keel comprising a forward portion and a rearward portion, the keel depending from the ski body and extending at least partway through the opening, the keel being adjustable with respect to the ski body; and
wherein the keel is adjustable laterally with respect to the ski body.

2. The ski for snow vehicle of claim 1, further comprising a plurality of dampers disposed between the ski body and the keel.

3. The ski for snow vehicle of claim 2, wherein the keel is detachable from the ski body.

4. The ski for snow vehicle of claim 2, wherein the keel is formed integral with the ski body, the keel being elastically deformable so that elastic deformation of the keel adjusts the keel with respect to the ski body.

5. The ski for snow vehicle of claim 2, wherein the forward portion of the keel is adjustable independently of the rearward portion of the keel.

6. The ski for snow vehicle of claim 2, further comprising a plurality of adjustment screws that engage a corresponding plurality of threads coupled with the ski body, the keel being adjustable by any combination of advancing and retracting the adjustment screws.

7. The ski of claim 2, wherein at least one of the dampers comprises an elastic member.

8. The ski of claim 2, wherein the ski is configured such that a force may be transmitted from the keel to the ski body through the dampers.

9. The ski of claim 2, further comprising a mechanism for adjusting the keel relative to the ski body.

10. The ski for snow vehicle of claim 1, wherein the keel is detachable from the ski body.

11. The ski for snow vehicle of claim 1, wherein the keel is formed integral with the ski body, the keel being elastically deformable so that elastic deformation of the keel adjusts the keel with respect to the ski body.

12. The ski for snow vehicle of claim 1, wherein the forward portion of the keel is adjustable independently of the rearward portion of the keel.

13. The ski for snow vehicle of claim 1, wherein the keel is adjustable with respect to the ski body between a minimum keel width and a maximum keel width.

14. The ski for snow vehicle of claim 13, wherein the forward portion of the keel is adjustable independently of the rearward portion of the keel.

15. The ski for snow vehicle of claim 1, wherein the width of the keel is adjustable with respect to the ski body.

16. A ski for a snow vehicle, comprising:
a ski body comprising a generally horizontal surface that contacts the snow when the ski is in use;
an opening being formed in the ski body;
a ski mounting bracket located on a top side of the ski body; and
a keel comprising a forward portion and a rearward portion, the keel depending from the ski body and extending at least partway through the opening, the keel being adjustable with respect to the ski body;
wherein a depth of the keel with respect to the ski body is adjustable and the keel is adjustable laterally with respect to the ski body.

17. The ski for snow vehicle of claim 16, wherein the lateral adjustment of the keel with respect to the ski body adjusts the width of the keel.

18. A ski for a snow vehicle, the ski being arranged along a central longitudinal plane of the ski, the ski comprising:
a ski body comprising a generally horizontal surface that contacts the snow when the ski is in use;
an opening formed in said ski body and having an opening length that is defined between a forward end of the opening and a rearward end of the opening;
a ski mounting bracket located on a top side of the ski body;
a keel depending from the generally horizontal surface of the ski body to a keel base and adapted to extend at least partially through the opening,
the keel comprising a keel length being defined between a forward end of the keel and a rearward end of the keel, a keel depth being defined between the generally horizontal surface and the keel base, and a keel width being defined between a first outermost lateral edge of the keel on one side of the central longitudinal plane and a second outermost lateral edge of the keel on the other side of the central longitudinal plane;
the keel length being greater than the opening length; and
a keel adjustment mechanism for adjusting the keel width.

19. The ski for snow vehicle of claim 18, wherein the keel adjustment mechanism is configured to adjust the keel depth.

20. The ski for snow vehicle of claim 18, wherein the keel adjustment mechanism comprises a plurality of adjustment screws that engage a corresponding plurality of threads coupled with the ski body, the keel being adjusted by any combination of advancing and retracting the adjustment screws.

21. A ski for a snow vehicle, the ski being arranged along a central longitudinal plane of the ski, the ski comprising:
a ski body comprising a generally horizontal surface that contacts the snow when the ski is in use;
an opening formed in said ski body and having an opening length that is defined between a forward end of the opening and a rearward end of the opening;
a ski mounting bracket located on a top side of the ski body;
a keel depending from the generally horizontal surface of the ski body to a keel base and adapted to extend at least partially through the opening,
the keel comprising a keel length being defined between a forward end of the keel and a rearward end of the keel, a keel depth being defined between the generally horizontal surface and the keel base, and a keel width being defined between a first outermost lateral edge of the keel on one side of the central longitudinal plane and a second outermost lateral edge of the keel on the other side of the central longitudinal plane;
the keel length being greater than the opening length;
a keel adjustment mechanism for adjusting the keel; and
a plurality of dampers disposed between the ski body and the keel.

22. The ski for snow vehicle of claim 21, wherein the keel is detachable from the ski body.

23. The ski for snow vehicle of claim 21, wherein the keel is formed integral with the ski body, the keel being elastically deformable so that elastic deformation of the keel adjusts the keel.

24. The ski for snow vehicle of claim 21, wherein the keel adjustment mechanism is arranged to independently adjust the forward portion and the rearward portion of the keel with respect to the ski body.

25. The ski for snow vehicle of claim 24, wherein the keel adjustment mechanism comprises a plurality of adjustment screws that engage a corresponding plurality of threads coupled with the ski body, the keel being adjusted by any combination of advancing and retracting the adjustment screws.

26. The snowmobile of claim 21, wherein at least one of the dampers comprises an elastic member.

27. The snowmobile of claim 21, wherein the ski is configured such that a force may be transmitted from the keel to the ski body through the dampers.

28. A ski for a snow vehicle, the ski being arranged along a central longitudinal plane of the ski, the ski comprising:
a ski body comprising a generally horizontal surface that contacts the snow when the ski is in use;
an opening formed in said ski body and having an opening length that is defined between a forward end of the opening and a rearward end of the opening;
a ski mounting bracket located on a top side of the ski body;
a keel depending from the generally horizontal surface of the ski body to a keel base and adapted to extend at least partially through the opening,
the keel comprising a keel length being defined between a forward end of the keel and a rearward end of the keel, a keel depth being defined between the generally horizontal surface and the keel base, and a keel width being defined between a first outermost lateral edge of the keel on one side of the central longitudinal plane and a second outermost lateral edge of the keel on the other side of the central longitudinal plane;
the keel length being greater than the opening length;
a keel adjustment mechanism for adjusting an aspect of the keel;
a keel depth adjustment mechanism provided between the ski body and the keel; and
a keel lateral dimension adjustment mechanism provided between the ski body and the keel.

29. The ski for snow vehicle of claim 28, wherein the keel lateral dimension adjustment mechanism adjusts the width of the keel.

30. A ski for a snow vehicle, the ski being arranged along a central longitudinal plane of the ski, the ski comprising:
a ski body comprising an upper surface and a lower surface, the lower surface comprising a generally horizontal portion that contacts the snow when the ski is in use;
an opening being defined in the ski body, the opening comprising a forward edge and a rearward edge;

a ski mounting bracket located on a top side of the ski body;

a keel depending from the generally horizontal surface of the ski body to a keel base, the keel comprising a forward portion and a rearward portion, the forward portion of the keel the keel being in contact with the upper surface of the ski body at a location forward of the forward edge of the opening and the rearward portion of the keel being in contact with the upper surface of the ski body at a location rearward of the rearward edge of the opening; and means for adjusting said keel;

wherein the means for adjusting said keel adjusts the keel laterally with respect to the ski body.

31. The ski for snow vehicle of claim 30, wherein the means for adjusting said keel adjusts the depth of the keel with respect to the ski body.

32. The ski for snow vehicle of claim 30, wherein the means for adjusting said keel adjusts a width of the keel.

33. The ski for snow vehicle of claim 30, wherein the means for adjusting said keel is adapted to independently adjust the forward portion of the keel and the rearward portion of the keel.

34. The snowmobile of claim 30, wherein the keel is adjustable with respect to the ski body between a minimum keel depth position and a maximum keel depth position.

35. The snowmobile of claim 30, wherein the keel is detachable from the ski body.

36. The snowmobile of claim 30, wherein the keel is formed integral with the ski body, the keel being elastically deformable so that elastic deformation of the keel adjusts the keel with respect to the ski body.

37. The snowmobile of claim 30, wherein the forward portion of the keel is adjustable independently of the rearward portion of the keel.

38. A snowmobile, comprising:

a body;

a pair of skis disposed generally below a forward portion of said body;

a drive arrangement disposed generally below a rearward portion of said body, said snowmobile sliding on said pair of skis and said snowmobile being powered in at least a forward direction by said drive arrangement, at least one of said skis comprising:

a ski body comprising a generally horizontal surface upon which the snowmobile slides when the ski is in use;

an opening being formed in the ski body;

a ski mounting bracket located on a top side of the ski body; and a keel comprising a forward portion and a rearward portion, the keel depending from the ski body and extending at least partway through the opening, the keel being adjustable with respect to the ski body, the keel being adjustable laterally with respect to the ski body.

39. The snowmobile of claim 38, wherein the forward portion of the keel is adjustable independently of the rearward portion of the keel.

40. The snowmobile of claim 38, wherein the keel is adjustable with respect to the ski body between a minimum keel width and a maximum keel width.

41. The snowmobile of claim 40, wherein the forward portion of the keel is adjustable independently of the rearward portion of the keel.

42. The snowmobile of claim 38, wherein the width of the keel is adjustable with respect to the ski body.

43. A snowmobile, comprising:

a body;

a pair of skis disposed generally below a forward portion of said body;

a drive arrangement disposed generally below a rearward portion of said body, said snowmobile sliding on said pair of skis and said snowmobile being powered in at least a forward direction by said drive arrangement, at least one of said skis comprising:

a ski body comprising a generally horizontal surface upon which the snowmobile slides when the ski is in use;

an opening being formed in the ski body;

a ski mounting bracket located on a top side of the ski body;

a keel comprising a forward portion and a rearward portion, the keel depending from the ski body and extending at least partway through the opening, the keel being adjustable with respect to the ski body; and wherein a depth of the keel with respect to the ski body is adjustable and the keel is adjustable laterally with respect to the ski body.

44. The snowmobile of claim 43, wherein the lateral adjustment of the keel with respect to the ski body adjusts the width of the keel.

* * * * *

UNITED STATES PATENT AND TRADEMARK OFFICE
CERTIFICATE OF CORRECTION

PATENT NO. : 6,971,653 B2
APPLICATION NO. : 10/366287
DATED : December 6, 2005
INVENTOR(S) : Kubota Takahiko It is certified that error appears in the above-identified patent and that said Letters Patent is hereby corrected as shown below:

At Column 1, line 40 delete "he" and insert --be--, therefor.

At Column 1, line 58 delete "include" and insert -- includes --, therefor.

At Column 1, line 59 delete "snow," and insert -- snow --, therefor.

At Column 2, line 16 delete "at op" and insert --a top --, therefor.

At Column 2, line 36 delete "sectional" and insert -- section --, therefor.

At Column 3, line 7 delete "part" and insert -- parts --, therefor.

At Column 3, line 16 delete "scat" and insert -- seat--, therefor.

At Column 3, line 23 delete "scat" and insert -- seat--, therefor.

At Column 3, line 35 delete "font" and insert -- front --, therefor.

At Column 3, line 51 delete "hack" and insert --back--, therefor.

At Column 3, line 51 delete "tile" and insert -- the--, therefor,

At Column 3, line 60 delete :"tire" and insert --the--, therefor.

At Column 4, line 17 (approx.) delete "mariner" and insert --manner--, therefor.

At Column 4, line 18 (approx.) delete "More" and insert --more--, therefor.

At Column 4, line 39 delete "try" and insert --to--, therefor.

At Column 4, line 42 delete "call" and insert -- can--, therefor.

At Column 4, line 62 delete "he" and insert --be--, therefor.

At Column 5, line 19 delete "he" and insert --be--, therefor.

At Column 5, line 43 delete "horses" and insert --bosses--, therefor.

At Column 5, line 59 delete "snow," and insert --snow--, therefor.

UNITED STATES PATENT AND TRADEMARK OFFICE
CERTIFICATE OF CORRECTION

PATENT NO. : 6,971,653 B2
APPLICATION NO. : 10/366287
DATED : December 6, 2005
INVENTOR(S) : Kubota Takahiko It is certified that error appears in the above-identified patent and that said Letters Patent is hereby corrected as shown below:

At Column 5, line 61 delete "feast" and insert --least--, therefor.

At Column 5, line 67 delete "oil" and insert --on--, therefor.

At Column 6, line 21 delete "reduce" and insert --reduces--, therefor.

At Column 6, line 46 delete "screw," and insert --screw--, therefor.

At Column 6, line 55 delete "he" and insert --be--, therefor.

At Column 6, line 56 delete "he" and insert --be--, therefor.

At Column 7, line 1 delete "out" and insert --nut--, therefor.

At Column 7, line 4 delete "coupling," and insert --coupling--therefor.

At Column 7, line 16 delete "file" and insert -- the--, therefor.

At Column 7, line 19 delete "he" and insert --be--, therefor.

At Column 8, line 1 delete "oil" and insert --on--, therefor.

At Column 8, line 18 delete " Corresponding" and insert --corresponding--, therefor.

At Column 9, line 1 delete "mechanists" and insert --mechanism--, therefor.

At Column 9, line 27 delete "fix" and insert --for--, therefor.

At Column 9, line 29 "declined" and insert --defined--, therefor.

At Column 9, line 30 delete "321" and insert --320--, therefor.

At Column 9, line 45 delete "he" and insert --be--, therefor.

At Column 9, line 49 delete "he" and insert --be--, therefor.

At Column 9, line 55 delete "oil" and insert --on--, therefor.

At Column 9, line 57 delete "he" and insert --be--, therefor.

UNITED STATES PATENT AND TRADEMARK OFFICE
CERTIFICATE OF CORRECTION

PATENT NO. : 6,971,653 B2
APPLICATION NO. : 10/366287
DATED : December 6, 2005
INVENTOR(S) : Kubota Takahiko It is certified that error appears in the above-identified patent and that said Letters Patent is hereby corrected as shown below:

At Column 9, line 59 delete "he" and insert --be--, therefor.

At Column 9, line 62 delete "oil" and insert --on--, therefor.

At Column 10, line 6 delete "teens" and insert --terms--, therefor.

Signed and Sealed this

Eighth Day of August, 2006

JON W. DUDAS
*Director of the United States Patent and Trademark Office*